United States Patent
Uysal et al.

(10) Patent No.: US 8,767,535 B2
(45) Date of Patent: Jul. 1, 2014

(54) DYNAMIC FEEDBACK CONTROL OF RESOURCES IN COMPUTING ENVIRONMENTS

(75) Inventors: Mustafa Uysal, Palo Alto, CA (US);
Pradeep Padala, Palo Alto, CA (US);
Xiaoyun Zhu, Palo Alto, CA (US);
Zhikui Wang, Palo Alto, CA (US);
Sharad Singhal, Palo Alto, CA (US);
Arif A. Merchant, Palo Alto, CA (US);
Kenneth Salem, Waterloo (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1428 days.

(21) Appl. No.: 11/827,605

(22) Filed: Jul. 11, 2007

(65) Prior Publication Data

US 2009/0016220 A1 Jan. 15, 2009

(51) Int. Cl.
*G06F 11/00* (2006.01)

(52) U.S. Cl.
USPC ............................ 370/230; 709/226; 709/229

(58) Field of Classification Search
USPC ............ 709/226, 229; 340/1.1–16.1; 710/36, 710/107, 200, 240; 711/150; 370/229–234, 370/254–258
See application file for complete search history.

(56) References Cited

U.S. PATENT DOCUMENTS

| | | | |
|---|---|---|---|
| 6,446,125 B1 * | 9/2002 | Huang et al. ................... | 709/226 |
| 7,437,730 B2 * | 10/2008 | Goyal ............................ | 718/105 |
| 7,536,461 B2 * | 5/2009 | Stecher et al. ................. | 709/226 |
| 2003/0037089 A1 * | 2/2003 | Cota-Robles et al. ............ | 709/1 |
| 2003/0191792 A1 * | 10/2003 | Waki et al. ..................... | 709/100 |
| 2005/0188088 A1 * | 8/2005 | Fellenstein et al. ............. | 709/226 |
| 2008/0141048 A1 * | 6/2008 | Palmer et al. .................. | 713/300 |

* cited by examiner

*Primary Examiner* — Mark Rinehart
*Assistant Examiner* — Mang Yeung

(57) ABSTRACT

A method for controlling resource allocation is provided. The method includes determining a service metric associated with a first application, wherein the first application is associated with one or more virtual machines. The method further includes comparing the service metric to an application specific service level goal associated with the first application and modifying a resource allocation associated with the first application at one or more of the virtual machines.

12 Claims, 4 Drawing Sheets

300

```
┌─────────────────────────────────────┐
│ Determining a service metric        │
│ associated with a first application,│
│ the first application associated    │
│ with one or more virtual machines.  │
│                 302                 │
└─────────────────────────────────────┘
                  │
                  ▼
┌─────────────────────────────────────┐
│ Comparing the service metric to an  │
│ application specific service level  │
│ goal associated with the            │
│ first application.                  │
│                 304                 │
└─────────────────────────────────────┘
                  │
                  ▼
┌─────────────────────────────────────┐
│ Modifying a resource allocation     │
│ associated with the first           │
│ application at one or more of       │
│ the virtual machines.               │
│                 306                 │
└─────────────────────────────────────┘
```

FIG. 3

DYNAMIC FEEDBACK CONTROL OF RESOURCES IN COMPUTING ENVIRONMENTS

TECHNICAL FIELD

The present invention is related to data processing. More specifically, embodiments of the present invention are related to managing quality of service (QoS).

BACKGROUND

Today's enterprise data centers are designed with a silo-oriented architecture in mind where each application has its own dedicated servers, storage and network infrastructure. A software stack tailored for the application controls these resources as a whole. Due to the stringent requirements placed on the enterprise applications and the time-varying demands that they experience, each application silo is vastly over-provisioned to meet the application service goals. As a result, data centers are often under-utilized, while some nodes may sometimes become heavily-loaded, resulting in service-level violations due to poor application performance.

One approach to increase resource utilization is to consolidate applications in a shared infrastructure using virtualization. Meeting application-level quality of service (QoS) goals becomes a challenge in a consolidated environment as application resource needs differ. Furthermore, for multi-tier applications, the amount of resources needed to achieve QoS goals might be different at each tier and may also depend on availability of resources in other tiers.

SUMMARY OF THE INVENTION

A method for controlling resource allocation is provided. The method includes determining a service metric associated with a first application, wherein the first application is associated with one or more virtual machines. The method further includes comparing the service metric to an application specific service level goal associated with the first application and modifying a resource allocation associated with the first application at one or more of the virtual machines.

In one embodiment, a feedback controller uses application level metrics to determine whether or not it is meeting application QoS requirements. For example, the feedback controller can determine how much (CPU) resources need to be provided at each tier to meet multi-tier application's QoS demands. Embodiments of the invention also provide a differentiation across multiple application stacks in overload conditions, by appropriately adjusting resource levels at each tier. In one embodiment, the present invention determines resource allocations for all resources hosted in virtual machines.

BRIEF DESCRIPTION OF THE DRAWINGS

The above and other objects and advantages of the present invention will be more readily appreciated from the following detailed description when read in conjunction with the accompanying drawings, wherein:

FIG. 3 is a data flow diagram of an exemplary method for controlling resource allocation at the virtual machine level in accordance with embodiments of the present invention.

DETAILED DESCRIPTION OF THE INVENTION

Figure 1:
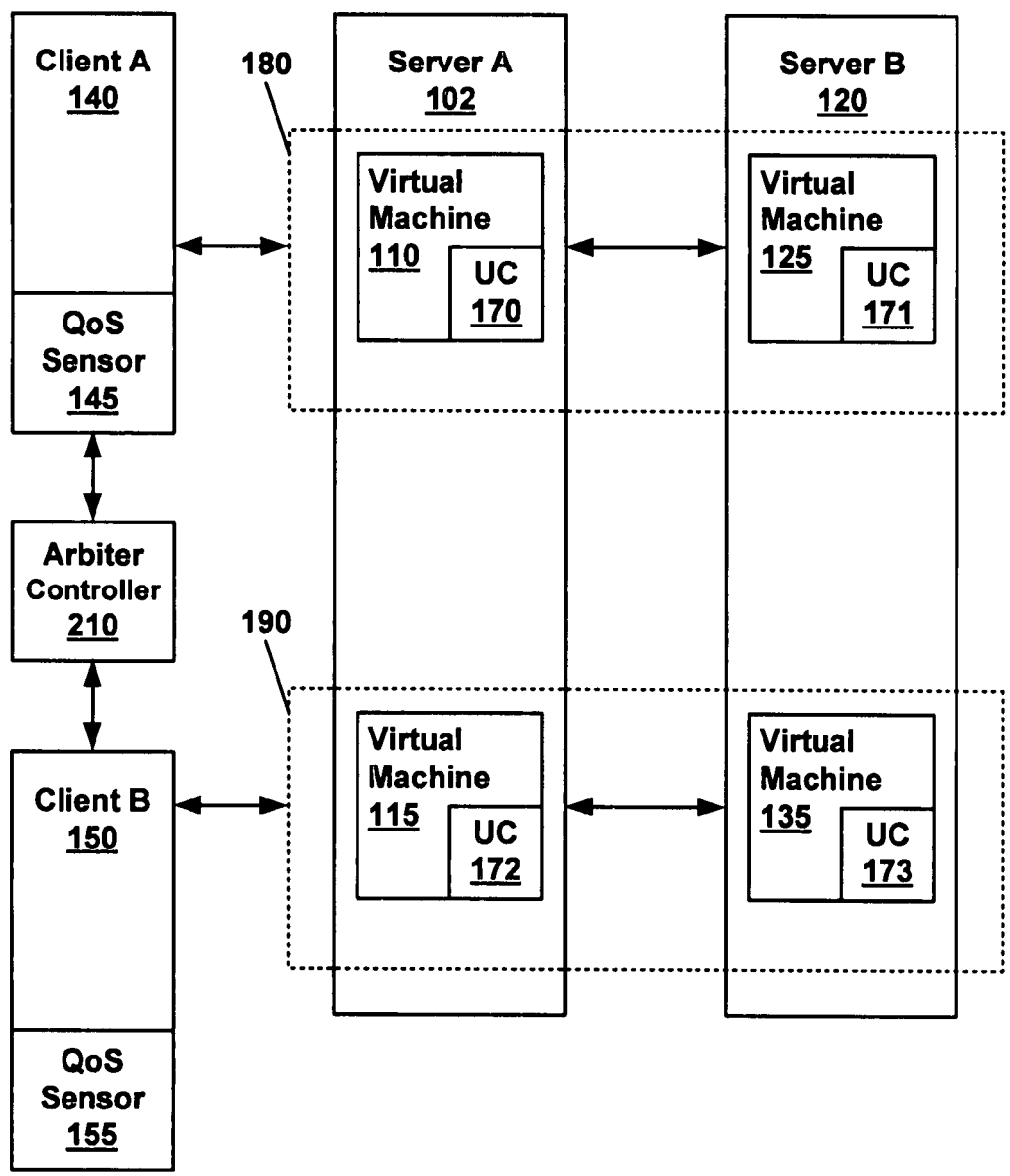
FIG. 1 is a block diagram of a virtualized computer environment including multi-tier applications shared among a plurality of servers in accordance with embodiments of the present invention.

Reference will now be made in detail to embodiments of the present invention, a system and method for controlling resource allocation, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some enterprise servers are designed with a utility computing paradigm in mind, where all hardware resources are pooled into a common shared infrastructure and applications share these resources as their demands change over time. In such a shared environment, meeting application-level Quality of Service goals is difficult because each application consumes different amounts of resources at different points in time. Embodiments of the present invention are directed towards an enterprise environment where a single application may be hosted across multiple virtual machines, sometimes residing on a plurality of computer systems. Embodiments of the invention dynamically modify resource allocations associated with a particular application to achieve threshold service levels. In one embodiment, the end-to-end performance, meaning performance from a user's perspective, is metric used to determine service quality. For example, an average response time can be used to determine a service level.

In one embodiment, a two-layered control system is used to dynamically control resource allocation across multi-tier enterprise applications that accounts for dependencies and interactions among multiple tiers in an application stack when making resource allocation decisions. In one embodiment, a portion of the controller adaptively adjusts resource allocations associated with a single application tier to keep utilization high while another portion of the controller controls resource allocations across multiple application tiers and multiple application stacks sharing the same infrastructure to provide service differentiation.

Embodiments of the present invention provide a system and method for controlling resource utilization for a virtual computing environment where multiple multi-tier applications share a common pool of server resources and each tier for each application can be hosted in a virtual machine.

FIG. 1 is a block diagram of a virtualized computer environment 100 including multi-tier applications 180 and 190 hosted among a pool of servers 102 and 120 in accordance with embodiments of the present invention. Application 180 is shared among server A 102 and server B 120. Application 180 is associated with virtual machine 110 at server A 102 and virtual machine 125 at server B 120. The arrows between the clients and the applications indicate request/responses.

Application 190 is also shared among server A 102 and server B 120. Application 190 is associated with virtual machine 115 at server A 102 and virtual machine 135 at server B 120.

Embodiments of the present invention control resource allocation at the virtual machine level to reach service goals. In one embodiment, the service goals are measured from the client perspective and a feedback controller is used to control resource allocation at the virtual machine level. For example, average response time from the client perspective could be used to establish a service level. However, it is appreciated that any number of metrics could be used to determine a service level associated with a particular multi-tier application that spans one or more virtual machines. Each application component contributes to the service goal and the objective is to determine how much resource to give each component (or tier).

In one embodiment, Client A 140 includes a Quality of Service (QoS) sensor 145 that determines performance metrics associated with application 180 from the client A's 140 perspective. The QoS Sensor 145 reports performance metrics to the arbiter controller 210 that dynamically determines resource allocations to virtual machines 1 5 10 and 125 that comprise multi-tier application 180. The arbiter controller 210 coordinates with the utilization controllers 170, 171, 172 and 173 to set target resource levels for the entire application.

Although in FIG. 1 the QoS sensors 145 and 155 are shown as coupled to the clients 140 and 150, respectively, it is appreciated that the QoS could be sensed through a "proxy" that resides between the client system and the application.

At the virtual machine level, resource allocation is dynamically modified according to performance goals for the entire application 180. In one embodiment, the utilization controllers try to modify the resource allocation so that (CPU) utilization for each virtual machine is high. In another embodiment, the arbiter controller 210 tries to modify resource allocation so that application level QoS differentiation is met. Application 180 is associated with virtual machines 110 and 125 and is also associated with utilization controllers 170 and 171, respectively. The utilization controllers 170 and 171 use the resource consumption and utilization targets to adjust resource allocations associated with application 180. The role of the utilization controllers is to provide high utilization of resources while the role of the arbiter controller 210 is to meet QoS performance goals.

Client B 150 includes a Quality of Service (QoS) sensor 155 that determines performance metrics associated with application 190 from the client B's 150 perspective. The QoS Sensor 155 reports performance metrics back to the arbiter controller 210.

At the virtual machine level, resource allocation is dynamically modified by the arbiter controller 210 according to performance goals for applications 180 and 190. Application 190 is associated with virtual machines 115 and 135 and is also associated with utilization controllers 172 and 173, respectively. The utilization controllers 172 and 173 report to the arbiter controller 210 that uses the performance metrics determined by the QoS sensor 155 to modify resource allocations associated with applications 180 and 190 to meet or attempt to meet performance goals for applications 180 and 190.

In one embodiment, a threshold performance level is determined for a particular application. When the threshold level is not met by the application from the client perspective, the resource allocations associated with the application are modified such that the application meets the threshold performance goal. This may include increasing/decreasing resource allocations associated with the application at one or more of the virtual machines it is associated with.

In the case a particular virtual machine does not have additional resources to allocate, the concept of application priority is used to determine which of competing applications receives particular resources. For example, utilization controllers can be located in a first layer and performance controllers can be located in a second layer. Performance differentiation between two or more applications is maintained when a contention occurs. In one embodiment, a ratio of performance goals between two or more applications is used to determine resource allocation.

Figure 2:
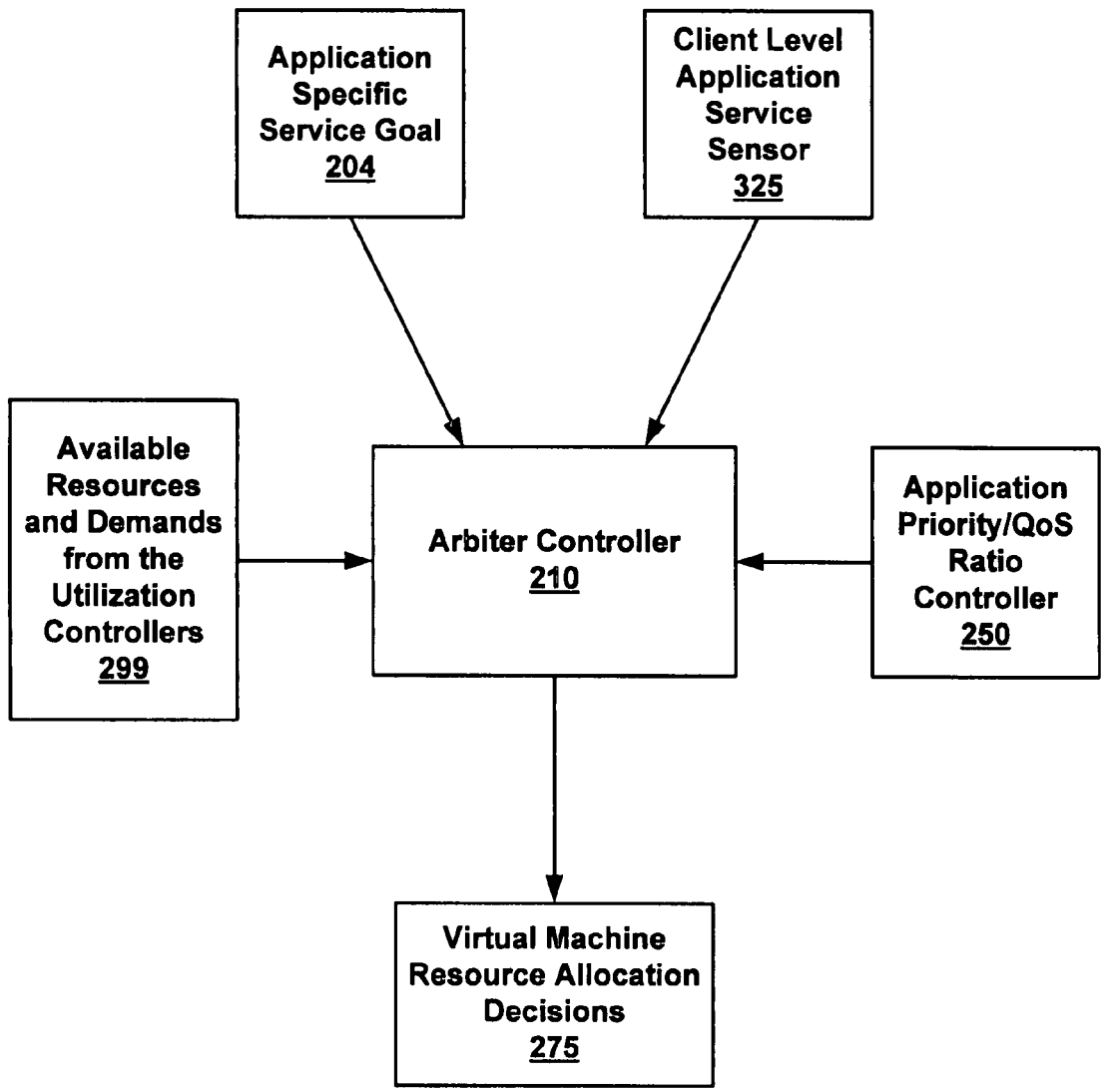
FIG. 2 is a block diagram of an exemplary data flow for controlling resource allocation for a particular application at the virtual machine level in accordance with embodiments of the present invention.

FIG. 2 is a block diagram 200 of an exemplary data flow for controlling resource allocation for multi-tier applications at the virtual machine level in accordance with embodiments of the present invention.

Embodiments of the present invention enable granular adjustment of resource allocation at the virtual machine level for applications that may be hosted among a pool of virtual machines. FIG. 2 illustrates the data flow to control resource allocation at a particular virtual machine associated with a single application.

Measured client level application service metrics are accessed, from QoS sensors 145 and 155 of FIG. 1. In one embodiment, it is not necessary to measure the QoS at the client. It just reflects the service level of the entire application stack (and indirectly the service received by the client). It is appreciated that the client level application service sensor 325 can measure any kind of performance data, including average response time for requests.

The arbiter controller 210 compares the performance metrics associated with the application specific service goals 204. The application specific service goal 204 may define a threshold level of service that should be achieved for the application across one or more virtual machines. In one embodiment, this is performed indirectly by setting a QoS ratio between multiple applications.

If the threshold service level is not achieved, the virtual machine resource allocation controller 210 checks the available resources 299 and if resources are available, the virtual machine resource allocation controller(s) modify the resource allocation for the application at one or more virtual machines to meet the service goal. In one embodiment, when using a ratio, the resource availability is not important. In this embodiment, resources are divided among the applications such that their target QoS ratio is achieved (if it is at all possible).

FIG. 3 is a data flow diagram of an exemplary method 300 for controlling resource allocation at the virtual machine level in accordance with embodiments of the present invention.

At 302, 300 includes determining a service metric associated with a first application wherein the first application is associated with one or more virtual machines. It is appreciated that applications can reside on virtual machines that themselves are on different computer systems (as shown in FIG. 1).

In one embodiment of the invention, a sensor coupled to a user end measures performance from a user perspective. In other words, end-to-end performance can be used to determine a level of service associated with the particular application.

In one embodiment, metrics such as average request response time are used to determine a level of service. However, it is appreciated that many different performance metrics and/or sensors for measuring performance metrics can be used in accordance with embodiments of the invention.

At 304, 300 includes comparing the service metric to an application specific service level goal associated with the first application. In one embodiment, a transition to target QoS ratio is set for a particular application.

It is appreciated that a particular service level goal may not be accomplishable when a particular virtual machine does not have additional resources available. In this case, the service goal may not be reachable.

At 306, 300 includes modifying a resource allocation associated with the first application at one or more of the virtual machines the application is associated with. In one embodiment, resource allocation, such as CPU usage is modified to maintain the service level determined in 306.

In one embodiment, resource allocations are modified on a virtual machine level, meaning allocated resources for a particular virtual machine are modified within a finite range of the computer system or server associated with the virtual machine.

In one embodiment, a prioritization and/or QoS ratios associated with the application is used to allocate resources when resources are contended between multiple applications and/or virtual machines. In one embodiment, an application can have a guaranteed (e.g., minimum allowable) service level. In this embodiment, the application with the guaranteed service level has highest priority when allocating resources. The arbiter controller 210 of FIG. 1 gives sufficient resources to each application. Although, a high priority application may get less resources than a low priority application so long as the QoS ratio between the two is maintained.

Exemplary Computer System

Figure 4:
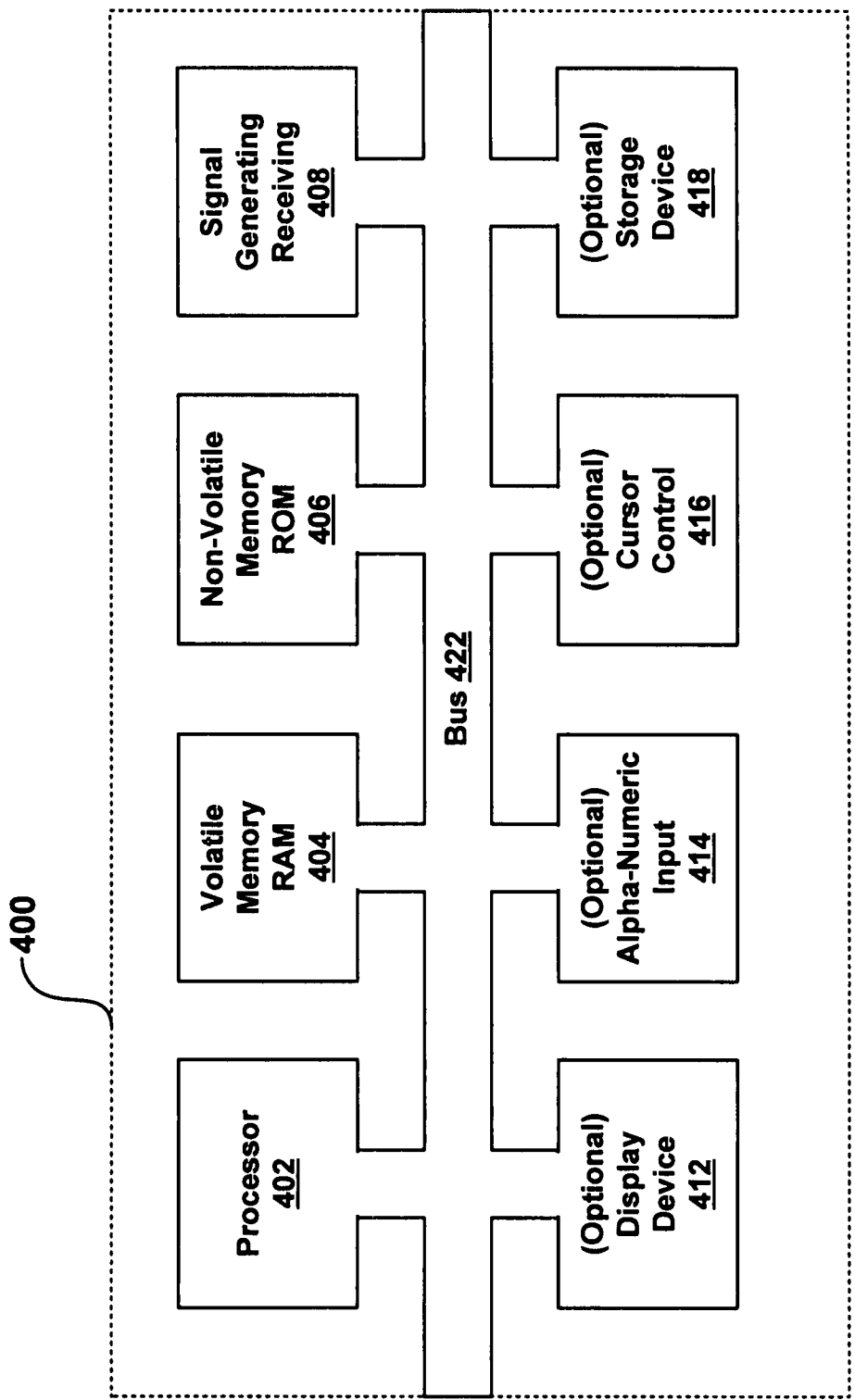
FIG. 4 is a block diagram of an exemplary computer system in accordance with embodiments of the present invention.

With reference to FIG. 4, portions of the present invention are comprised of computer-readable and computer-executable instructions that reside, for example, in computer system 400, which may be used as a part of a general-purpose computer network (not shown). It is appreciated that computer system 400 of FIG. 4 is exemplary only and that the present invention can operate within a number of different computer systems including general-purpose computer systems, embedded computer systems, laptop computer systems, hand-held computer systems, virtualized computer systems and stand-alone computer systems.

In the present embodiment, computer system 400 includes an address/data bus 422 for conveying digital information between the various components, a central processor unit (CPU) 402 for processing the digital information and instructions, a volatile main memory 404 comprised of volatile random access memory (RAM) for storing the digital information and instructions, and a non-volatile read only memory (ROM) 406 for storing information and instructions of a more permanent nature. In addition, computer system 400 may also include a data storage device 418 (e.g., a magnetic, optical, floppy, or tape drive or the like) for storing vast amounts of data. It should be noted that the software program for outputting information of the present invention can be stored either in volatile memory 404, data storage device 418, or in an external storage device (not shown).

Devices which are optionally coupled to computer system 400 include a display device 412 for displaying information to a computer user, an alpha-numeric input device 414 (e.g., a keyboard), and a cursor control device 416 (e.g., mouse, trackball, light pen, etc.) for inputting data, selections, updates, etc. Computer system 400 can also include a mechanism for emitting an audible signal (not shown).

Furthermore, computer system 400 can include an input/output (I/O) signal unit (e.g., interface) 408 for interfacing with a peripheral device (e.g., a printer, a computer network, modem, mass storage device, etc.). Accordingly, computer system 400 may be coupled in a network, such as a client/server environment, whereby a number of clients (e.g., personal computers, workstations, portable computers, mini-computers, terminals, etc.) are used to run processes for performing desired tasks (e.g., printing, outputting information, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer implemented method for controlling resource allocation comprising:
   determining application specific service level goals for at least one multi-tier application, said at least one multi-tier application hosted across at least one of a first virtual machine operating on a first computer system and a second virtual machine operating on a second computer system, wherein a first layer on said first virtual machine hosts a first tier of said at least one multi-tier application and a second layer on said first virtual machine hosts a second tier of said at least one multi-tier application;
   measuring at least one service metric associated with said at least one multi-tier application, wherein said at least one service metric is based on a perspective of a client computer interacting with said at least one multi-tier application;
   comparing said at least one service metric to said application specific service level goals;
   based on said comparing, determining that said at least one multi-tier application is not meeting a threshold performance service level;
   determining that said first virtual machine lacks additional resources for allocation to enable full operation of said first and second tier thereon; and
   modifying a resource allocation associated with said at least one multi-tier application at at least one of said first virtual machine and said second virtual machine, wherein said modifying comprises:
      prioritizing an operation of either said first tier or said second tier; and
      based on said prioritizing, allocating resources of said first virtual machine such that a prioritized tier is fully enabled for operation.

2. The computer implemented method as described in claim 1, wherein said measuring said at least one service metric comprises:
   determining an average end-to-end response time associated with said at least one multi-tier application.

3. The computer implemented method as described in claim 1, further comprising:
   determining resource availability at one or more virtual machines associated with said at least one multi-tier application.

4. The computer implemented method as described in claim 1, further comprising:
  determining a prioritization associated with said at least one multi-tier application.

5. The computer implemented method as described in claim 4, further comprising:
  comparing said prioritization associated with a first multi-tier application of said at least one multi-tier application to a prioritization associated with a second multi-tier application of said at least one multi-tier application; and
  modifying resource allocations associated with said first multi-tier application and said second multi-tier application at one or more virtual machines associated with said at least one multi-tier application based on said prioritization.

6. The computer implemented method as described in claim 1, further comprising:
  modifying said application specific service level goals associated with said first multi-tier application.

7. A non-transitory computer readable storage medium comprising executable instructions which, when executed in a processing system, causes the system to perform a method for controlling resource utilization, said method comprising:
  determining application specific service level goals for at least one multi-tier application, said at least one multi-tier application hosted across at least one of a first virtual machine operating on a first computer system and a second virtual machine operating on a second computer system, wherein a first layer on said first virtual machine hosts a first tier of said at least one multi-tier application and a second layer on said first virtual machine hosts a second tier of said at least one multi-tier application;
  measuring at least one service metric associated with said at least one multi-tier application, wherein said at least one service metric is based on a perspective of a client computer interacting with said at least one multi-tier application;
  comparing said at least one service metric to said application specific service level goals;
  based on said comparing, determining that said at least one multi-tier application is not meeting a threshold performance service level;
  determining that said first virtual machine lacks additional resources for allocation to enable full operation of said first and second tier thereon; and
  modifying a resource allocation associated with said at least one multi-tier application at at least one of said first virtual machine and said second virtual machine, wherein said modifying comprises:
    prioritizing an operation of either said first tier or said second tier; and
    based on said prioritizing, allocating resources of said first virtual machine such that a prioritized tier is fully enabled for operation.

8. The non-transitory computer readable storage medium as described in claim 7, wherein said measuring said at least one service metric comprises:
  determining an average end-to-end response time associated with said at least one multi-tier application.

9. The non-transitory computer readable storage medium as described in claim 7, wherein said method further comprises:
  determining resource availability at one or more virtual machines associated with said at least one multi-tier application.

10. The non-transitory computer readable storage medium as described in claim 7, wherein said method further comprises:
  determining a prioritization associated with said at least one multi-tier application.

11. The non-transitory computer readable storage medium as described in claim 10, wherein said method further comprises:
  comparing said prioritization associated with a first multi-tier application of said at least one multi-tier application to a prioritization associated with a second multi-tier application of said at least one multi-tier application; and
  modifying resource allocations associated with said first multi-tier application and said second multi-tier application at one or more virtual machines associated with said at least one multi-tier application based on said prioritization.

12. The non-transitory computer readable storage medium as described in claim 7, wherein said method further comprises:
  modifying said application specific service level goals associated with said first multi-tier application.

* * * * *